United States Patent [19]
Kim

[11] Patent Number: 6,101,154
[45] Date of Patent: Aug. 8, 2000

[54] METHOD OF RECORDING DATA ON MAGNETO-OPTICAL RECORDING MEDIUM AND APPARATUS THEREOF

[75] Inventor: Dae Young Kim, Seoul, Rep. of Korea

[73] Assignee: LG Electronics Inc., Seoul, Rep. of Korea

[21] Appl. No.: 09/222,963

[22] Filed: Dec. 30, 1998

[30] Foreign Application Priority Data

Dec. 31, 1997 [KR] Rep. of Korea ................... P97-81828

[51] Int. Cl.[7] .................................................. G11B 11/00
[52] U.S. Cl. ............................................. 369/13; 369/116
[58] Field of Search ............................... 369/13, 116, 14, 369/54, 124, 59, 110; 300/114, 59; 365/122

[56] References Cited

U.S. PATENT DOCUMENTS 4,998,231  3/1991  Watanabe et al. ........................ 369/13
5,170,383  12/1992 Yonezawa et al. ....................... 369/13
5,513,165  4/1996  Ide et al. ................................ 369/116

FOREIGN PATENT DOCUMENTS

1-292603    3/1989   Japan .
40-1169760A 7/1989   Japan .
40-6325381A 11/1994  Japan .

*Primary Examiner*—Tan Dinh

[57] ABSTRACT

A method and apparatus for recording data on a magneto-optical recording medium that is adapted to record a data on the magneto-optical recording medium without cross-erasing and to record a data on the magneto-optical recording medium in such a manner to have a high track density. A distance between the center upon recording of partially overlapped recording marks and the center upon reproducing thereof is detected from the magneto-optical recording medium in which a data is recorded by means of the recording marks. An intensity of a recording light beam is controlled depending on the distance between the centers.

15 Claims, 9 Drawing Sheets

FIG.2
RELATED ART

CHCK

CHBT

LPB

MM

RMT

METHOD OF RECORDING DATA ON MAGNETO-OPTICAL RECORDING MEDIUM AND APPARATUS THEREOF

BACKGROUND OF THE INVENTION

1. Field of the Invention

This invention relates to a method of recording data on a magneto-optical recording medium and an apparatus therefor.

2. Description of the Related Art

Nowadays, a magneto-optical recording medium is available for use as an information recording medium permitting a high density of overwriting. In particular, a magneto-optical recording medium using a recording layer made from an amorphous alloy of a rare-earth metal with a transition metal possesses excellent characteristics.

A process of recording a data on such a magneto-optical recording medium will be briefly described below. A laser light is converged onto the surface of the magneto-optical recording medium in a shape of a small spot having approximately a size of the wavelength thereof to increase the temperature in a recording layer to about 150 to 200° C. When the temperature in the recording layer of the magneto-optical recording medium heated with a laser light becomes above the Curie temperature Tc, a magnetization phenomenon disappears at the corresponding portion in the magneto-optical recording medium. At this time, if a direct-current bias magnetic field is applied to the magneto-optical recording medium in a unitary direction by means of a magnet, then a magnetization inversion arises to emerge a mark or pit when the heated portion of the recording layer returns to room temperature.

Figure 1:
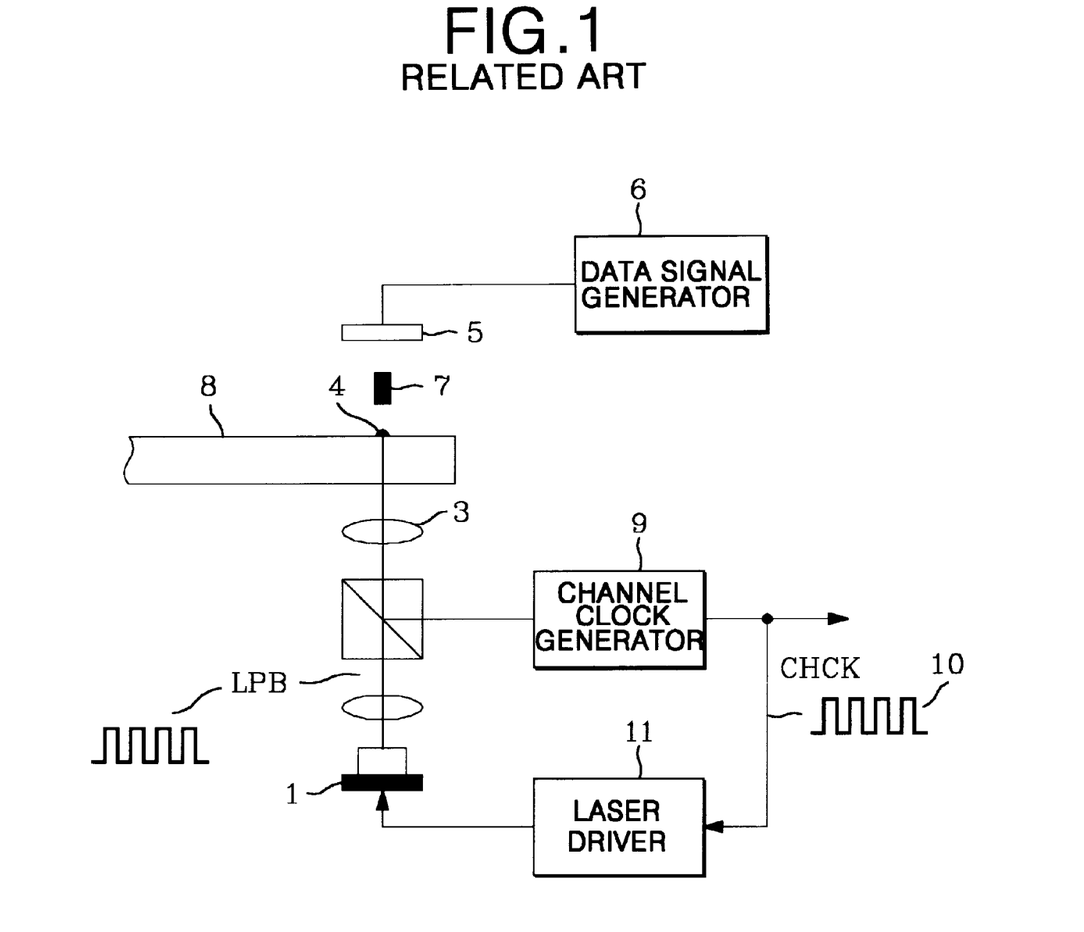
FIG. 1 is a schematic view showing the configuration of a conventional data recording apparatus for a magneto-optical recording medium.
Figure 2:
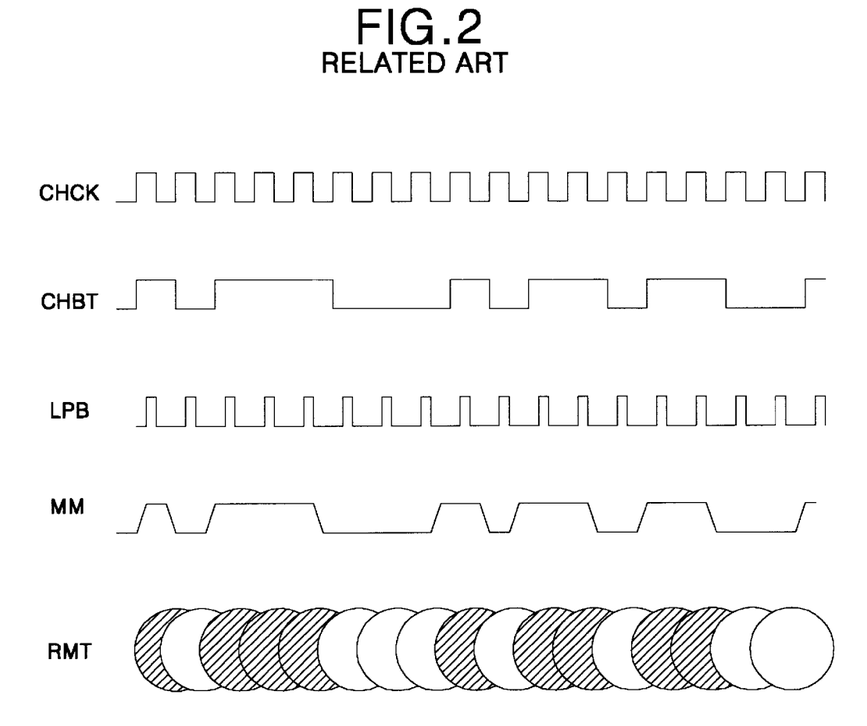
FIG. 2 is output waveform diagrams of each part of the recording apparatus in FIG. 1.

An example of an apparatus for recording data on a magneto-optical recording medium in this manner is disclosed in the Japanese Laid-open Patent Gazette No. Heisei 1-292603. The recording apparatus in the Japanese patent has a circuit configuration as shown in FIG. 1. In FIG. 1, a channel clock generator 9 generates a channel clock signal CHCK, as shown in FIG. 2, on the basis of an information pre-formatted on a magneto-optical disc 8. A laser driver 11 allows a laser diode 1 to make a pulse emission in accordance with the channel clock signal CHCK, thereby irradiating a laser pulse beam LPB, as shown in FIG. 2, onto the magneto-optical disc 8 in a spot shape by means of an objective lens 3. A data signal generator 6 generates a modulated magnetic field MM, as shown in FIG. 2, using a magnetic head 5 installed in the vicinity of the magneto-optical disc 8. Accordingly, a recording mark train RMT, as shown in FIG. 2, corresponding to a channel bit train CHBT as shown in FIG. 2 emerges at the magneto-optical disc 8. Since a laser light is irradiated onto the magneto-optical disc 8 in the pulse shape as described above, the recording marks emerging at the magneto-optical disc 8 are partially overlapped. Also, since the recording marks are overlapped, data recording density in the magneto-optical disc 8 increases.

Figure 3:
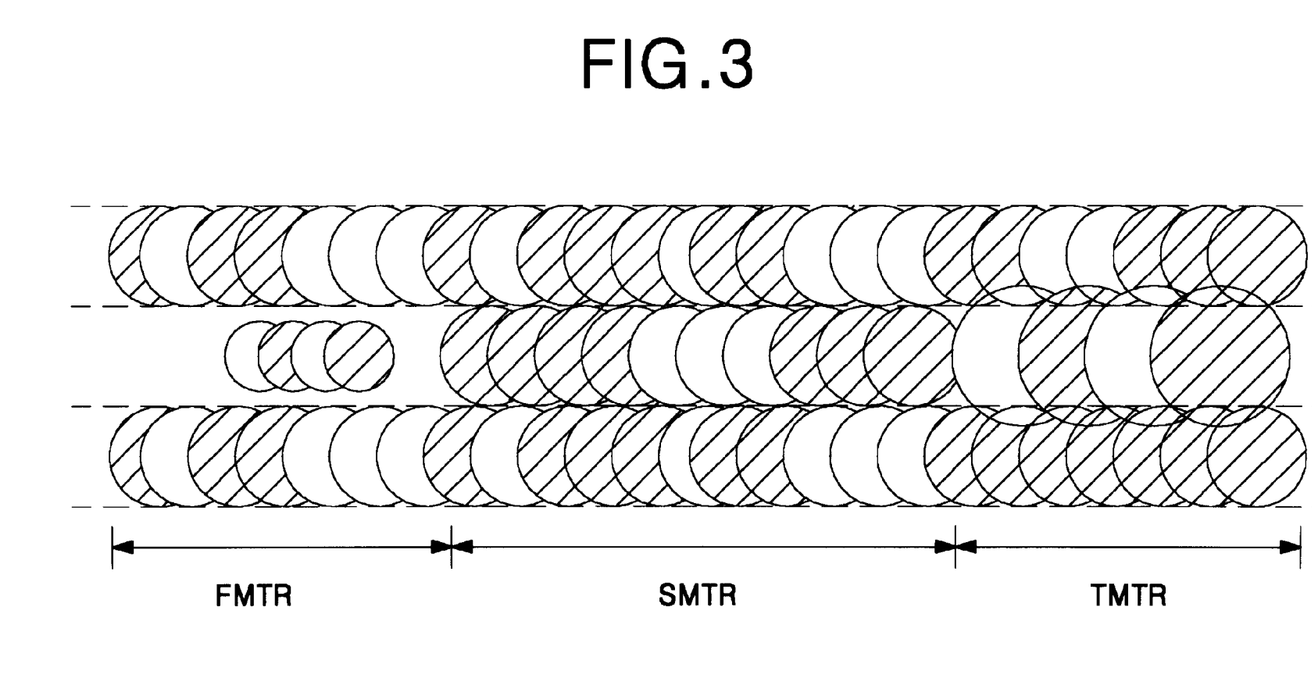
FIG. 3 illustrates a state of recording marks due to a variation in light power.

Light power must be constantly maintained so as to produce recording marks of the same size. The light power determining the size of the recording marks may be strengthened or weakened depending on temperature, exterior interference, etc. Actually, the recording marks increase or decrease in size as recorded on the second track, shown in FIG. 3, depending on variation in light power. In detail, if the light power is appropriately maintained, each of the recording marks is of an appropriate size as recorded in a second track region SMTR. When light power is weakened, no problems are created because the size of the recording mark decreases as recorded in first track region FMTR. On the other hand, when light power is strengthened, the size of the recording mark increases as recorded in the third track region TMTR and the width of track is broadened to thereby cause a so-called "cross-erasing" that causes marks pre-recorded on the adjacent tracks to be erased. Such a variation in the light power can not heighten a track density in the magneto-optical recording medium above a certain limit.

SUMMARY OF THE INVENTION

Accordingly, it is an object of the present invention to provide a method and apparatus for recording data on a magneto-optical recording medium that is adapted to record a data on the magneto-optical recording medium without cross-erasing.

A object of the present invention is to provide a method and apparatus for recording data on a magneto-optical recording medium that is adapted to record a data on the magneto-optical recording medium in such a manner to have a high track density.

In order to achieve these and other objects of the invention, a data recording method for a magneto-optical recording medium according to one aspect of the present invention includes the steps of detecting a distance between the center of a recording mark corresponding to the center of a light spot used in the recording mode and the center of the recording mark to be reproduced in the reproducing mode, from the magneto-optical recording medium; and controlling an intensity of a recording light beam depending on the distance between the centers.

A data recording method for a magneto-optical recording medium according to another aspect of the present invention includes the steps of recording a data onto the magneto-optical recording medium on the basis of a predetermined period of a first clock; reproducing the data recorded on the magneto-optical recording medium; generating a predetermined period of a second clock on the basis of the data reproduced from the magneto-optical recording medium; detecting a phase difference between the first clock and second clocks; and controlling an intensity of a recording light beam on the basis of the phase difference.

An apparatus for recording data on a magneto-optical recording medium according to still another aspect of the present invention includes means for recording the data onto the magneto-optical recording medium on the basis of a predetermined period of a first clock; means for reproducing the data recorded on the magneto-optical recording medium; means for generating a predetermined period of a second clock on the basis of the data from the reproducing means; means for detecting a phase difference between the first clock and second clocks; and means for controlling an intensity of a recording light beam on the basis of the phase difference from the detecting means.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 4:
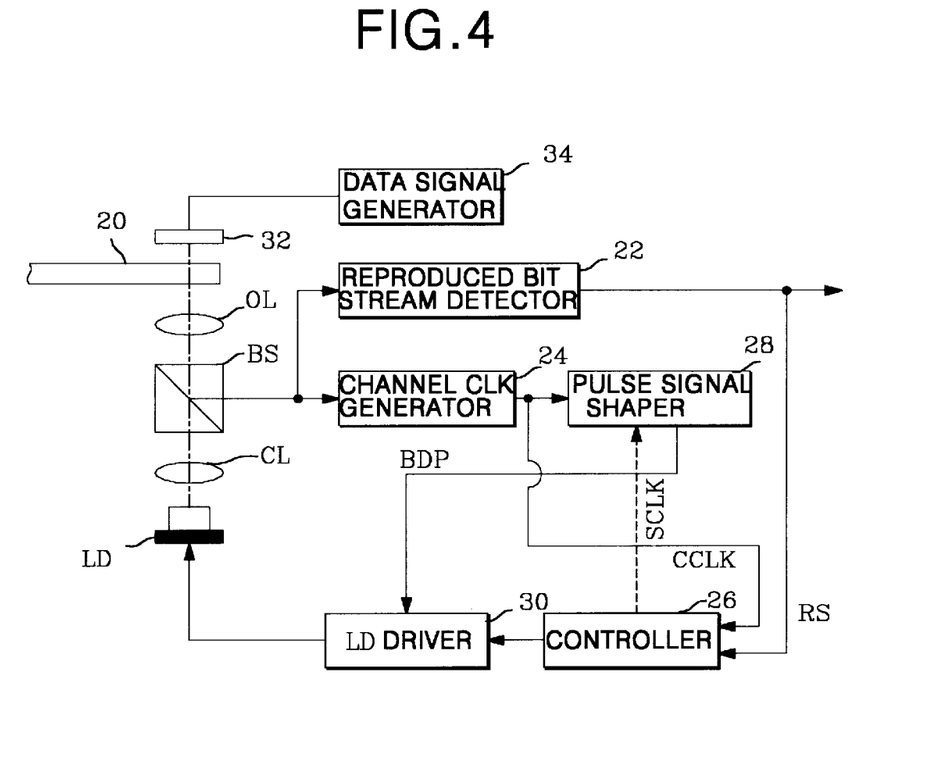
FIG. 4 is a schematic view showing the configuration of an apparatus for recording/reproducing data on a magneto-optical recording medium according to an embodiment of the present invention.
Figure 5:
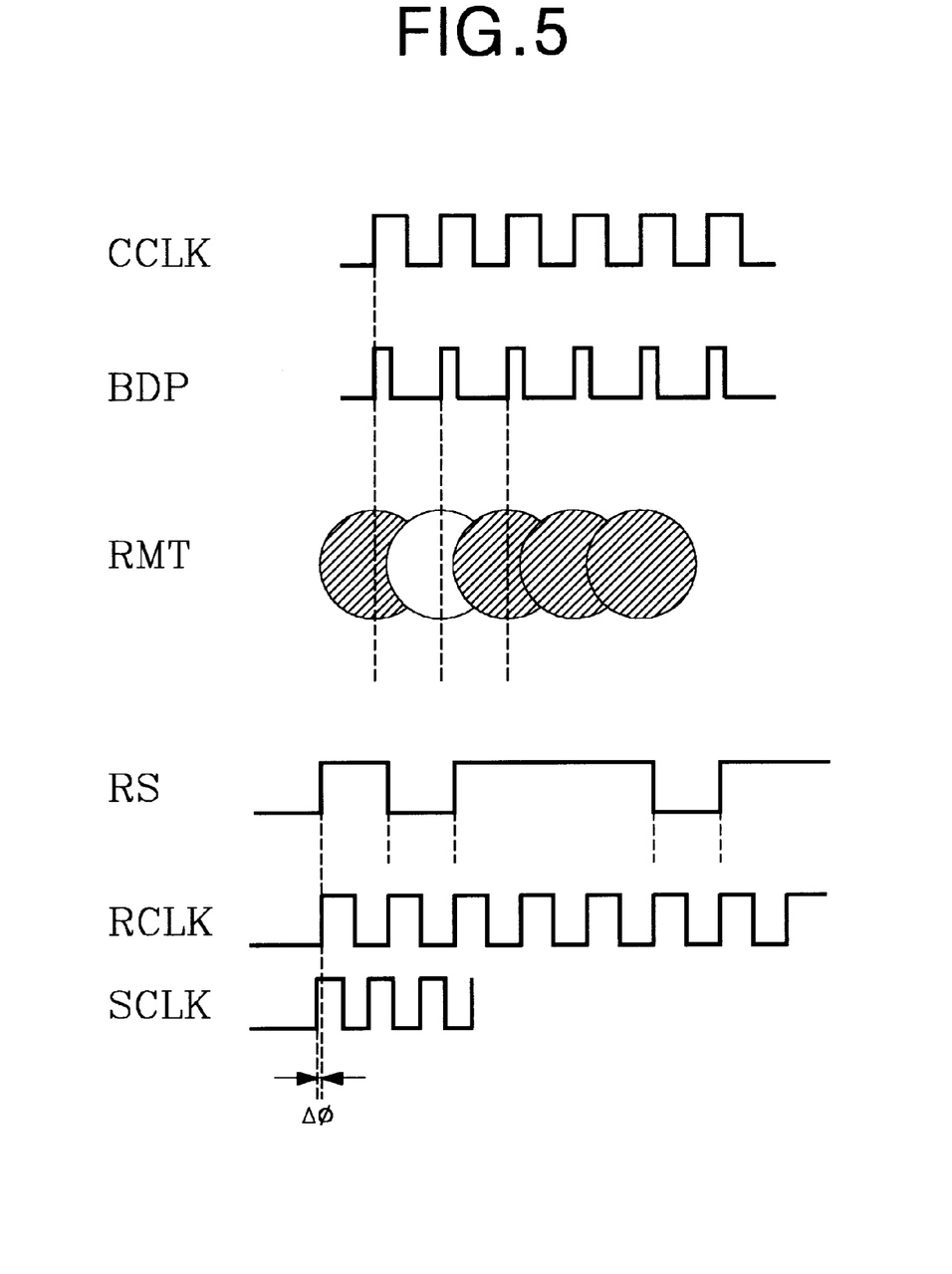
FIG. 5 is output waveform diagrams of each part of the recording/reproducing apparatus shown in FIG. 4.

Referring to FIG. 4, there is shown an apparatus for recording/reproducing data on a magneto-optical disc according to an embodiment of the present invention. The recording/reproducing apparatus includes a collimator lens CL arranged between an optical disc 20 and a laser diode LD, a beam splitter BS, and an objective lens OL. The laser diode LD generates a light beam to be irradiated onto the lower surface of the optical disc 20. A light beam generated at the laser diode LD is converged by means of the collimator lens CL and then irradiated, via the beam splitter BS and the objective lens OL, onto the lower surface of the disc 20 in a spot shape. The objective lens OL serves to focus a light beam to be irradiated onto the disc 20. The beam splitter BS passes through a light beam from the collimator lens CL toward the objective lens OL; while directing a reflective light beam received, via the objective lens OL, from the disc 20 toward a reproduced bit stream detector 22 and a channel clock generator 24. The reproduced bit stream detector 22 reproduces a bit stream RS, as shown in FIG. 5, recorded on the disc 20 from a reflective light beam from the beam splitter BS. The channel clock generator 24 generates a channel clock CCLK, as shown in FIG. 5, by utilizing the reflective light beam from the beam splitter BS. The channel clock CCLK generated at the channel clock generator 24 is pre-formatted on the disc 20 in a known method.

Figure 6:
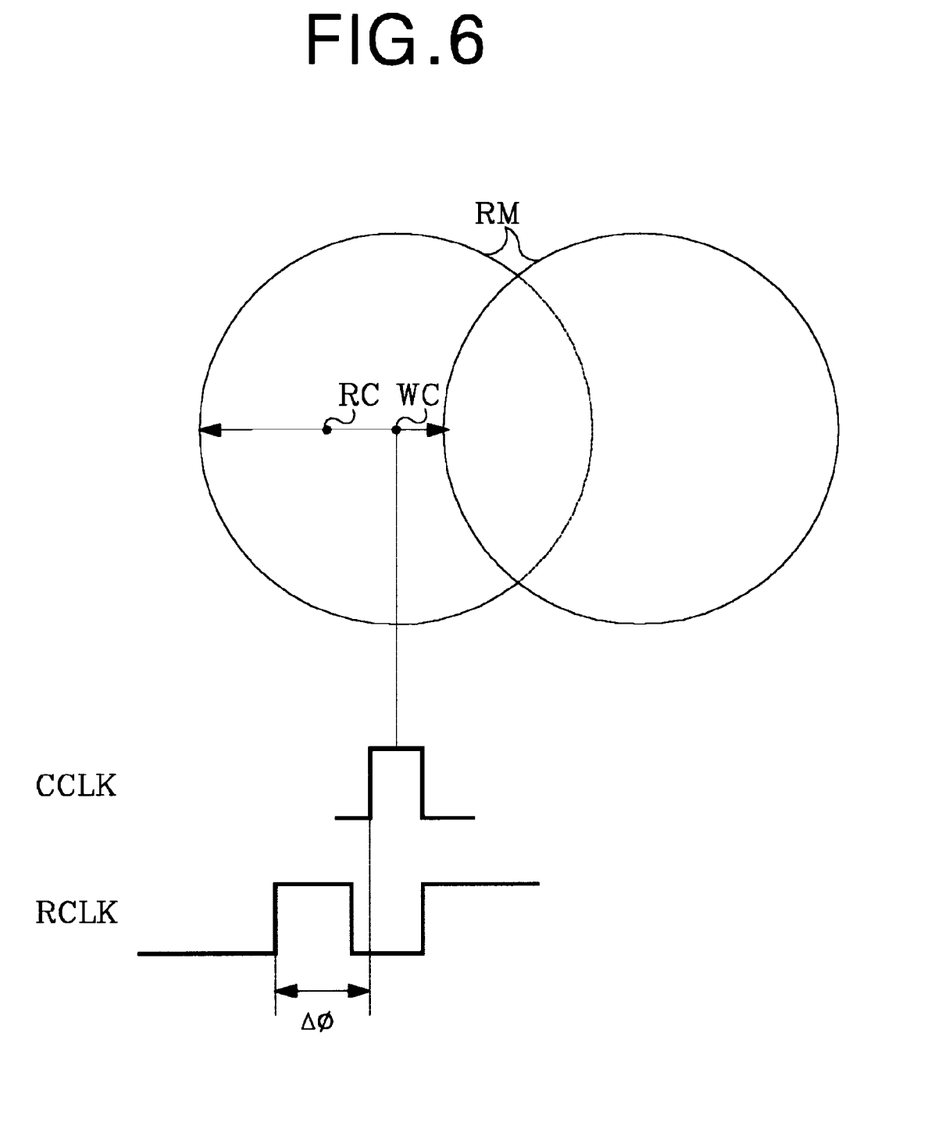
FIG. 6 is a view for explaining the relationship between the recording center of a recording mark and the reproducing center thereof.
Figure 7:
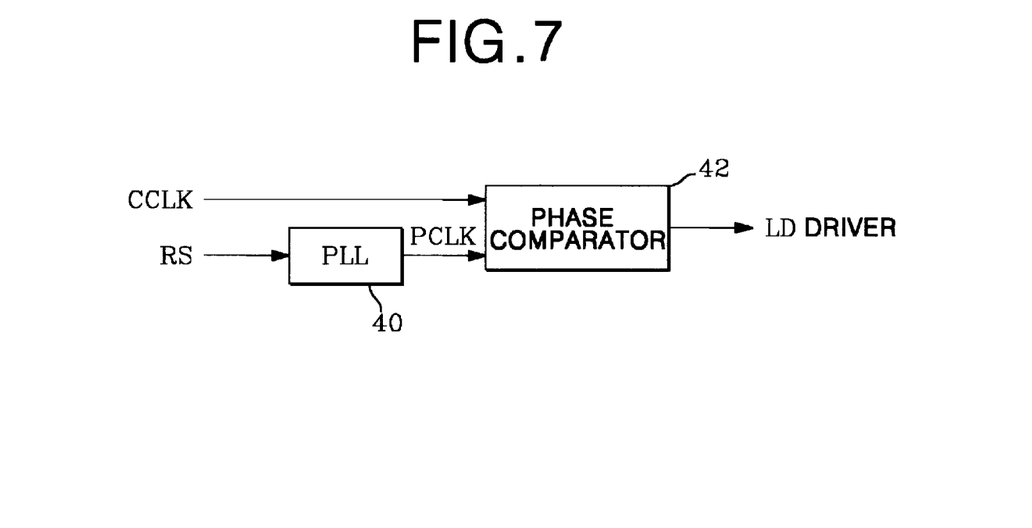
FIG. 7 is a detailed block diagram of an embodiment of the controller shown in FIG. 4.
Figure 8:
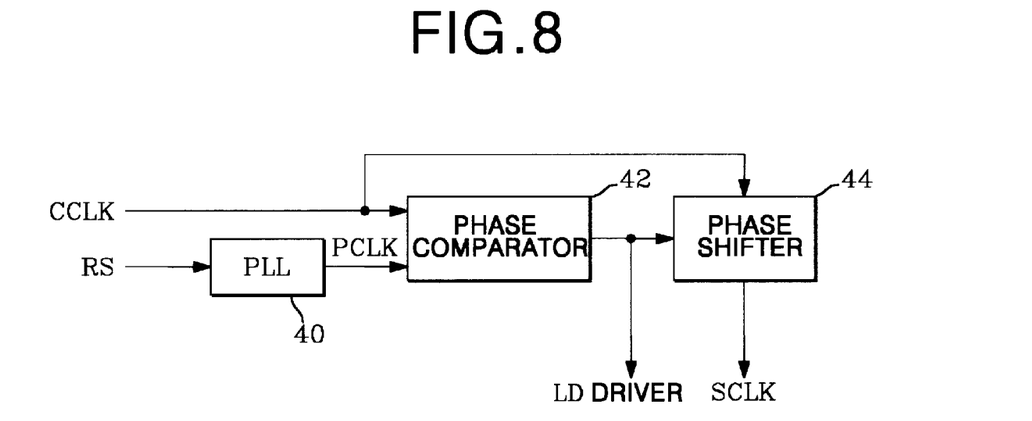
FIG. 8 is a detailed block diagram of another embodiment of the controller shown in FIG. 4.

The recording/reproducing apparatus further includes a controller 26 and a pulse signal shaper 28 for commonly receiving the channel clock CCLK from the channel clock generator 24, and a laser diode driver 30 for driving the laser diode LD. The controller 26 detects a phase difference between the channel clock CCLK from the channel clock generator 24 and a reproducing clock RCLK, as shown in FIG. 5, included in the reproduced bit stream RS reproduced by the reproduced bit stream detector 22 and applies the detected phase difference to the laser diode driver 30 as a light power control signal. As shown in FIG. 6, this phase difference has a size corresponding to a distance between the center WC of a recording mark RM used at the time of recording, hereinafter referred to as "recording center", and the center RC of a recording mark RM used at the time of reproducing, hereinafter referred to as "reproducing center". The phase difference corresponding to a distance between the recording center WC and the reproducing center RC is proportional to the size of recording mark, that is, the intensity of recording light. The controller 26 may generate a reference clock SCLK by phase-delaying the channel clock CCLK by the detected phase difference. This reference clock SCLK allows a new data stream to be recorded on the disc 20 to make a phase synchronization with the previously recorded data stream, thereby performing a reproduction of the magneto-optical recording medium stably and accurately. To this end, the controller 26 can be configured as shown in FIG. 7 or FIG. 8. The pulse signal shaper 28 waveform-shapes the channel clock CCLK from the channel clock generator 24 to generate a beam driving pulse BDP having a very small duty cycle, as shown in FIG. 5, and applies the beam driving pulse BDP to the laser diode driver 30. Alternatively, the pulse signal shaper 28 may utilize the reference clock SCLK from the controller 26 instead of the channel clock CCLK from the channel clock generator 24 to generate the beam driving pulse BDP. The laser diode driver 30 utilizes a phase difference value detected by the controller 26 to set a recording light power at the time of recording a data. Also, the laser diode driver 30 intermits the laser diode LD in accordance with the beam driving pulse BDP from the pulse signal shaper 28, thereby generating a pulse shape of light beam at the laser diode LD.

Moreover, the recording/reproducing apparatus includes a magnetic head 32 positioned at the upper portion of the disc 20, and a data signal generator 34 for receiving a recording data. The data signal generator 34 changes a direction of a magnetic field applied to the disc 20 from the magnetic head 32 in accordance with a logical value of a recording data, thereby recording a recording mark train RMT depending on a data, as shown in FIG. 5, on the disc 20. The pitch of the recording mark train RFT recorded on the disc 20, that is, the size of recording marks is not only constantly maintained, but also is reduced, by maintaining the intensity of recording light constantly with a distance between the recording center WC and the reproducing center RC. As a result, in the magneto-optical recording medium, the track density can not only be heightened, but also the storage capacity can be increased.

FIG. 7 shows an embodiment of the controller 26 of FIG. 4. As shown in FIG. 7, the controller 26 consists of a phase locked loop(PLL) 40 for receiving the reproduced bit stream RS, and a phase comparator 42 for receiving the channel clock CCLK. The PLL 40 detects a reproducing clock RCLK representing a period of a bit data from the reproduced bit stream RS and applies the detected reproducing clock RCLK to the phase comparator 42. The phase comparator 42 compares a phase of the channel clock CCLK with that of the reproducing clock RCLK from the PLL 40 to detect a phase difference between the two clocks CCLK and RCLK. The phase difference detected at the phase comparator 42 has a value corresponding to a distance between the recording center WC of the recording mark RM and the reproducing center RC thereof as shown in FIG. 6. Such a phase difference is supplied to the laser diode driver 30 in FIG. 4 to determine the intensity of recording light. The center of a recording mark corresponds to the center of a light spot used in recording mode FIG. 8 shows another embodiment of the controller 26 in FIG. 4. The controller 26 according to another embodiment further includes a phase shifter 44 compared with the controller 26 shown in FIG. 7. The phase shifter 44 receives a phase difference from the phase comparator 42 and the channel clock CCLK from the channel clock generator 24.

Also, the phase shifter 44 delays the channel clock CCLK by the phase difference to generate the reference clock SCLK as shown in FIG. 5. The reference clock SCLK is applied to the pulse signal shaper 28 shown in FIG. 4, thereby synchronizing the beam driving pulse BPD with the reproducing center RC at the time of reproducing. In other words, the reference clock SCLK allows the center of a light beam irradiated onto the disc 20 at the time of reproducing to be consistent with the reproducing center RC of the recording mark RM. As a result, a data recorded on the magneto-optical recording medium can be reproduced accurately and stably.

Figure 9:
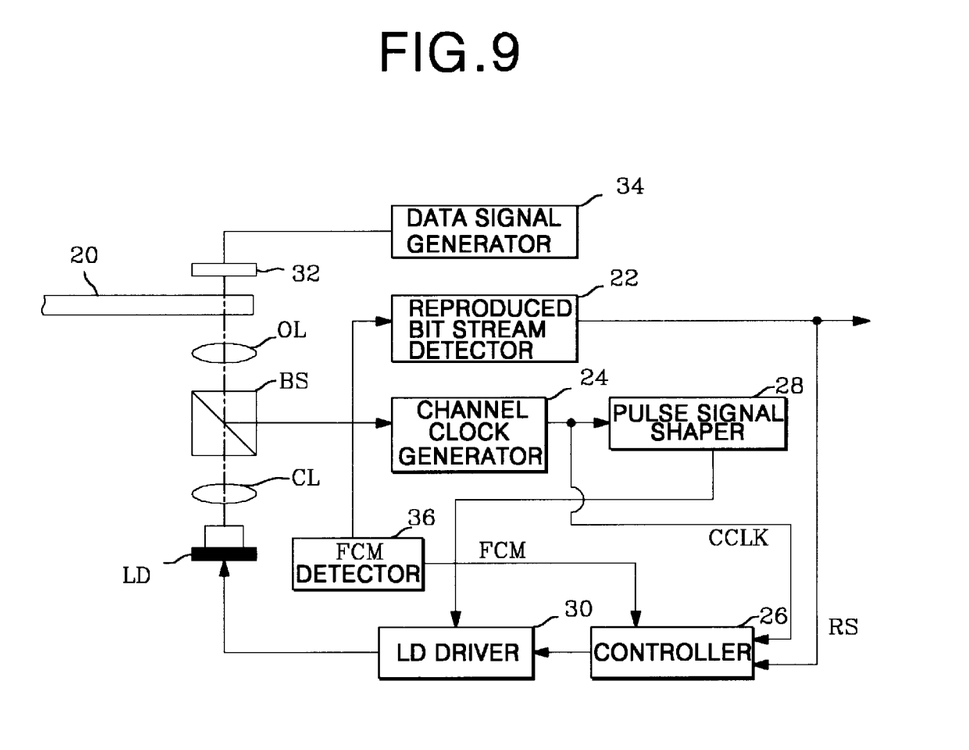
FIG. 9 is a schematic view showing the configuration of an apparatus for recording/reproducing data on a magneto-optical recording medium according to another embodiment of the present invention.

Referring now to FIG. 9, there is shown an apparatus for recording/reproducing data on a magneto-optical recording medium according to another embodiment of the present invention. The data recording/reproducing apparatus includes a collimator lens CL arranged between an optical disc 20 and a laser diode LD, a beam splitter BS, and an objective lens OL. The laser diode LD generates a light beam to be irradiated onto the lower surface of the optical disc 20. A light beam generated at the laser diode LD is converged by means of the collimator lens CL and then irradiated, via the beam splitter BS and the objective lens OL, onto the lower surface of the disc 20 in a spot shape. The objective lens OL serves to focus a light beam to be irradiated onto the disc 20. The beam splitter BS passes through a light beam from the collimator lens CL toward the objective lens OL; while directing a reflective light beam received, via the objective lens OL, from the disc 20 toward a reproduced bit stream detector 20, a channel clock generator 24 and a fine clock mark FCM detector 36. The reproduced bit stream detector 22 reproduces a bit stream RS, as shown in FIG. 5, recorded on the disc 20 from a reflective light beam from the beam splitter BS. The reproducing bit stream RS reproduced at the reproduced bit stream detector 22 includes a test data pattern used to set the intensity of recording light beam appropriately. The test data pattern is recorded on the magneto-optical recording medium, i.e., the disc 20, in advance upon manufacturing or in the pre-treating step of recording, and which is recorded at a position having the fine clock mark FCM as a starting point. The channel clock generator 24 generates a channel clock CCLK, as shown in FIG. 5, by utilizing the reflective light beam from the beam splitter BS. The channel clock CCLK generated at the channel clock generator 24 is pre-formatted on the disc 20 using a known method. The fine clock mark detector 36 also detects the fine clock mark FCM from the reflective light beam from the beam splitter BS. The fine clock mark FCM detected by means of the fine clock mark detector 36 is pre-formatted in every constant region for the purpose of a stable driving of the specified area of the disc using a known method.

Figure 10:
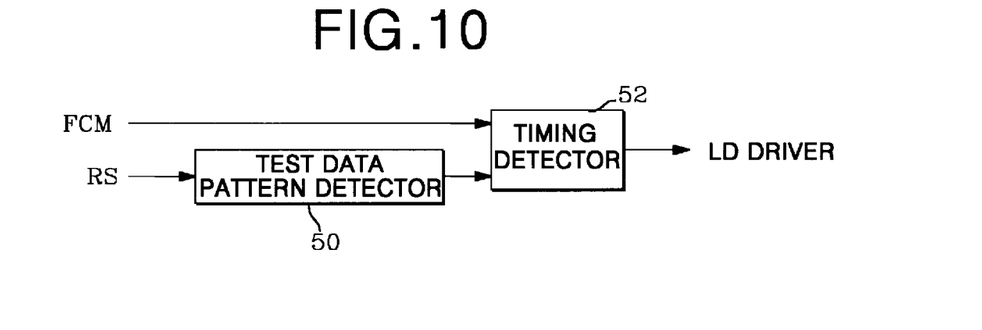
FIG. 10 is a detailed block diagram of an embodiment of the controller shown in FIG. 9.
Figure 11:
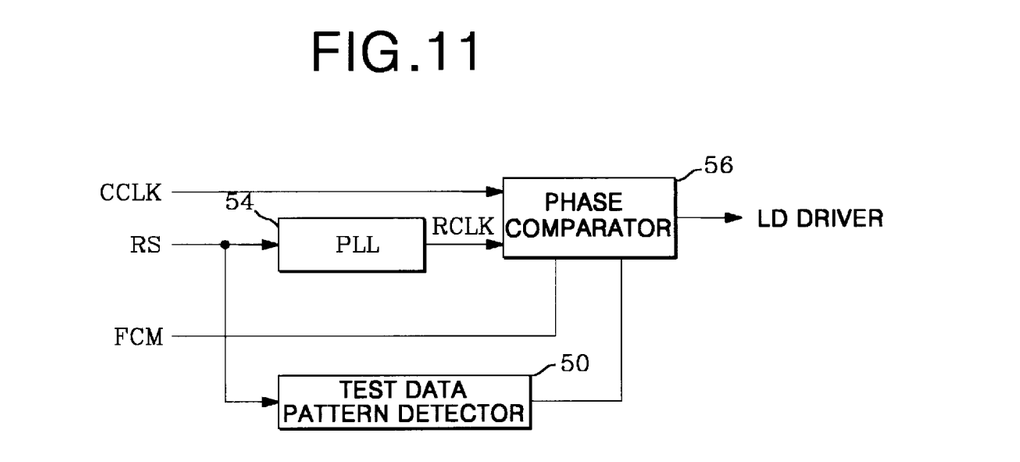
FIG. 11 is a detailed block diagram of another embodiment of the controller shown in FIG. 9.

The recording/reproducing apparatus further includes a controller 26 for receiving the fine clock mark FCM from the fine clock mark detector 36 and the reproduced bit stream RS from the reproduced bit stream detector 22, a pulse signal shaper 28 for receiving the channel clock CCLK from the channel clock generator 24, and a laser diode driver 30 for driving the laser diode LD. The controller 26 detects a phase difference between the test data patterns included in the fine clock mark FCM and the reproduced bit stream RS, that is, a distance between the recording center WC of the recording mark RM and the reproducing center RC thereof and applies the detected phase difference to the laser diode driver 30. To this end, the controller 26 may have a circuit configuration as shown in FIG. 10 in which the fine clock mark FCM and the reproduced bit stream RS are utilized, or a circuit configuration as shown in FIG. 11 in which the channel clock CCLK is utilized in addition to the fine clock mark FCM and the reproduced bit stream RS. The pulse signal shaper 28 waveform-shapes the channel clock CCLK from the channel clock generator 24 to generate a beam driving pulse BDP having a very small duty cycle, as shown in FIG. 5, and applies the beam driving pulse BDP to the laser diode driver 30. The laser diode driver 30 utilizes a phase difference value detected by the controller 26 to set a recording light power at the time of recording a data. Also, the laser diode driver 30 intermits the laser diode LD in accordance with the beam driving pulse BDP from the pulse signal shaper 28, thereby generating a pulse shape in light beam emitted from the laser diode LD.

Moreover, the recording/reproducing apparatus includes a magnetic head 32 positioned at the upper portion of the disc 20, and a data signal generator 34 for receiving a recording data. The data signal generator 34 changes a direction of a magnetic field applied to the disc 20 from the magnetic head 32 in accordance with a logical value of a recording data, thereby recording a recording mark train RMT depending on a data, as shown in FIG. 5, on the disc 20. The pitch of the recording mark train RFT recorded on the disc 20, that is, the size of recording marks is not only constantly maintained, but also is reduced, by maintaining the intensity of recording light constantly with a distance between the recording center WC and the reproducing center RC. As a result, in the magneto-optical recording medium, the track density can not only be heightened, but also the storage capacity can be increased. Utilizing the fine clock mark FCM and the test data pattern provides an advantage in that it can accurately detect a distance between the recording center and the reproducing center compared with the case of the channel clock CCLK and the reproducing clock RCLK.

FIG. 10 shows an embodiment of the controller 26 in FIG. 9. As shown in FIG. 10, the controller 26 consists of a test data pattern detector 50 for receiving the reproduced bit stream RS, and a timing detector 52 for receiving the fine clock mark FCM. The test data pattern detector 50 compares the reproduced bit stream RS with a reference data pattern to generate a pattern detecting signal when the reproduced bit stream identical to the reference data pattern is inputted. This pattern detecting signal maintains a specific logic during a time interval when the test data pattern is located. The timing detector 52 compares a phase of the fine clock mark FCM with that of the pattern detecting signal to detect a phase difference between the two signals, that is, a distance between a starting point of the fine clock mark FCM and a starting point of the test data pattern. The phase difference detected at the timing detector 52 has a value corresponding to a distance between the recording center WC of the recording mark RM and the reproducing center RC thereof. Such a phase difference is supplied to the laser diode driver 30 in FIG. 9 to determine the intensity of recording light.

FIG. 11 shows another embodiment of the controller 26 of FIG. 9. The controller 26 according to another embodiment further includes a test data pattern detector 50 and a PLL 54 for receiving the reproduced bit stream RS, and a phase comparator 56 for receiving the fine clock mark FCM. The test data pattern detector 50 compares the reproduced bit stream RS with a reference data pattern to generate a pattern detecting signal when a reproduced bit stream RS is identical to the reference data pattern. This pattern detecting signal maintains a specific logic during a time interval when the test data pattern is located. The PLL 54 produces a reproducing clock RCLK indicating a period of a bit data from the reproduced bit stream RS and applies the detected reproducing clock RCLK. The phase comparator 56 compares a phase of the fine clock mark FCM with that of the pattern detecting signal to detect a phase difference between the two signals, that is, a distance between a starting point of the fine clock mark FCM and a starting point of the test data pattern. At the same time, the phase comparator 56 compares a phase of the channel clock CCLK with that of the reproducing clock RCLK from the PLL 54 to detect a phase difference between the two clocks CCLK and RCLK. Also, the phase comparator 56 corrects a phase difference between the fine clock mark FCM and the pattern detecting signal by means of a phase difference between the two clocks and supplies the corrected phase difference to the laser diode driver 30 shown in FIG. 9. The corrected phase difference improves a non-linear relationship between the size and the intensity of a light beam. The laser diode driver 30 appropriately controls the intensity of a recording light beam at the time of recording with the aid of the corrected phase difference, thereby preventing an occurrence of the cross-erasing and reducing the size of recording mark. As a result, in the magneto-optical recording medium, i.e., the disc 20, a track density can be heightened and a storage capacity can be increased.

As described above, in the data recording/reproducing apparatus for a magneto-optical recording medium according to the present invention, the intensity of a light beam is controlled on a basis of a distance between the recording center and the reproducing center of the recording mark, so that a constant size of recording marks can be recorded and the size of recording marks can be reduced. As a result, a track density of the magneto-optical recording medium is heightened and a storage capacity is improved. Also, the cross-erasing does not occur.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of recording a data on a magneto-optical recording medium, comprising the steps of:

detecting a distance between the center of a recording mark corresponding to the center of a light spot used in recording mode and the center of the recording mark to be read in reproducing mode, from the magneto-optical recording medium; and controlling an intensity of a recording light beam depending on the distance between the centers.

2. The method as claimed in claim 1, wherein the distance between the centers is obtained on the basis of a predetermined period of a first clock used in the recording mode and a second clock delivered from a data reproducing signal.

3. The method as claimed in claim 2, wherein the first clock is delivered from a signal preformatted on the magneto-optical recording medium.

4. The method as claimed in claim 3, wherein the first clock is a channel clock for synchronizing the data to be recorded on the magneto-optical recording medium.

5. The method as claimed in claim 3, wherein the first clock is a fine clock allowing the recording regions of the magneto-optical recording medium to stably drive.

6. The method as claimed in claim 2, wherein the data reproducing signal includes a test pattern recorded on a test area of the magneto-optical recording medium.

7. The method as claimed in claim 6, wherein the second clock indicates a time when the test pattern is detected.

8. A method of recording a data on a magneto-optical recording medium, comprising the steps of:

recording the data onto the magneto-optical recording medium on the basis of a predetermined period of a first clock;

reproducing the data recorded on the magneto-optical recording medium;

generating a predetermined period of a second clock on the basis of the data reproduced from the magneto-optical recording medium;

detecting a phase difference between the first clock and second clocks; and controlling an intensity of a recording light beam on the basis of the phase difference.

9. The method as claimed in claim 8, wherein the first clock is a signal preformatted on the magneto-optical recording medium.

10. The method as claimed in claim 8, wherein the first clock is a channel clock for synchronizing the data to be recorded on the magneto-optical recording medium.

11. The method as claimed in claim 8, wherein the data includes a test pattern recorded on a test area of the magneto-optical recording medium.

12. An apparatus for recording a data on a magneto-optical recording medium, comprising:

means for recording the data onto the magneto-optical recording medium on the basis of a predetermined period of a first clock;

means for reproducing the data recorded on the magneto-optical recording medium;

means for generating a predetermined period of a second clock on the basis of the data from the reproducing means;

means for detecting a phase difference between the first clock and second clocks; and means for controlling an intensity of a recording light beam on the basis of the phase difference from the detecting means.

13. The apparatus as claimed in claim 12, wherein the first clock is a signal preformatted on the magneto-optical recording medium.

14. The apparatus as claimed in claim 12, wherein the first clock is a channel clock for synchronizing the data to be recorded on the magneto-optical recording medium.

15. The apparatus as claimed in claim 12, wherein the data includes a test pattern recorded on a test area of the magneto-optical recording medium.

* * * * *